(12) United States Patent
Hickey et al.

(10) Patent No.: US 7,194,965 B2
(45) Date of Patent: Mar. 27, 2007

(54) VARIETY LOCATOR

(75) Inventors: David W. Hickey, Johnston, IA (US); Michael Bajc, Matherville, IL (US); Craig A. Sutton, Ankeny, IA (US)

(73) Assignee: Deere & Company, Moline, IL (US)

( * ) Notice: Subject to any disclaimer, the term of this patent is extended or adjusted under 35 U.S.C. 154(b) by 254 days.

(21) Appl. No.: 11/031,330

(22) Filed: Jan. 6, 2005

(65) Prior Publication Data
US 2006/0162631 A1    Jul. 27, 2006

(51) Int. Cl.
G06F 7/70    (2006.01)
G06F 19/00   (2006.01)
G06G 7/00    (2006.01)
G06G 7/76    (2006.01)

(52) U.S. Cl. .................. 111/200; 111/900; 111/903; 701/50

(58) Field of Classification Search ............... 111/200, 111/900, 903; 701/50
See application file for complete search history.

(56) References Cited

U.S. PATENT DOCUMENTS 5,771,169 A    6/1998  Wendte ................... 364/420
5,870,689 A    2/1999  Hale et al. ................... 702/5
2002/0035431 A1  3/2002  Ell ........................... 702/5
2003/0159633 A1  8/2003  Upadhyaya et al. ........ 111/200

FOREIGN PATENT DOCUMENTS

EP    0723740    7/2000
GB    2178934    2/1987

Primary Examiner—Christopher J. Novosad
(74) Attorney, Agent, or Firm—Suiter Swantz pc llo

(57) ABSTRACT

A system and method for providing an input attribute collected in an area while harvesting a crop from the area is described. The input attribute is collected and the geographic position occupied by a machine for applying materials to the area is measured. The input attribute and the geographic position are transmitted to a central system and associated with a zone including the geographic position at which the input attribute was collected. The zone is stored along with its associated input attribute. As the crop is harvested, the geographic position occupied by the harvesting machine is measured. The measured position of the harvesting machine is compared with the stored zone. If the position of the harvesting machine is determined to be in the stored zone, the input attribute associated with the zone is supplied to the operator of the harvesting machine.

20 Claims, 3 Drawing Sheets

VARIETY LOCATOR

FIELD OF THE INVENTION

The present invention generally relates to the field of planting and harvesting crops, and more particularly to a variety locator for utilizing information collected during the planting and growing phases of the crop production cycle for segregating the crop during harvesting.

BACKGROUND OF THE INVENTION

Frequently, it is desirable to segregate a crop harvested from a tillable area. For instance, different geographical regions of the tillable area may be seeded with different varieties of seed. Alternatively, different geographical regions of the tillable area may be seeded with the same variety of seed, but may be fertilized with differing varieties of fertilizer. Thus, if portions of the crop are to be harvested and stored with like varieties, information about the crop collected during the planting and growing phases of the crop production cycle must be available during the harvest. However, current mapping systems in agriculture do not allow producers to have real-time geographically referenced visibility of this data during the harvest. Frequently, an operator must re-enter parameters of the crop and field applications while harvesting the crop. Often such information has been forgotten, or is in error.

Thus, there exists a need for a system and method to provide real-time geographically referenced visibility of data collected during the planting and growing phases of the crop production cycle.

SUMMARY OF THE INVENTION

Accordingly, the present invention is directed to a system and method for providing an input attribute collected in a tillable area while harvesting a crop from the tillable area. First, the input attribute is collected before the crop is harvested, e.g. information collected during the planting and growing phases of the crop production cycle is input by an operator of a machine. Then, a geographic position (e.g., latitude and longitude) occupied by the machine is measured utilizing a positioning system, preferably when the input attribute is collected The input attribute and the geographic position are transmitted from the machine to a central system, such as a personal desktop computer, a centrally located server, or the like. Next, the input attribute is associated with a zone including the geographic position at which the input attribute was collected. The zone includes other geographic positions for which the same (or sufficiently similar) input attributes have been collected. Thus, the zone represents a geographic region in which the input attribute is applicable.

Next, the zone is stored along with its associated input attribute in a database, a linked list, or in another data format. In one embodiment, the zone is stored as one or more grid cells. In another embodiment, the zone is stored as a polygon. As the crop planted in the tillable area is harvested, a geographic position occupied by the harvesting machine is measured. Next, the measured position of the machine is compared with the stored zone. If the position of the machine is determined to be within the stored zone, the input attribute associated with the zone is supplied to the operator of the harvesting machine. For instance, if the position of the harvesting machine is within the bounds of a grid cell stored with the zone, the input attribute associated with the grid cell is supplied to the operator. Alternatively, if the position of the harvesting machine is within the exterior boundary of a polygon representing the stored zone, the input attribute associated with the stored zone is supplied to the operator of the machine.

Thus, the input attribute, in combination with the zone, may be utilized for segregating a harvested crop. For instance, a crop harvested from the tillable area may be segregated by harvesting only a portion of the crop located within a first zone, while harvesting another portion of the crop from another zone having a different input attribute, and keeping the harvested crop loads separated. In this manner, the harvested crop is segregated. It will also be appreciated that an input attribute collected and associated with a zone may be further associated with a portion of the crop harvested from the zone for identification purposes. Further, a positioning system, the collected input attribute, and the zone may be utilized for providing automated guidance to a harvesting machine for guiding the machine to harvest a desired portion of the crop disposed within a zone having a desired input attribute.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
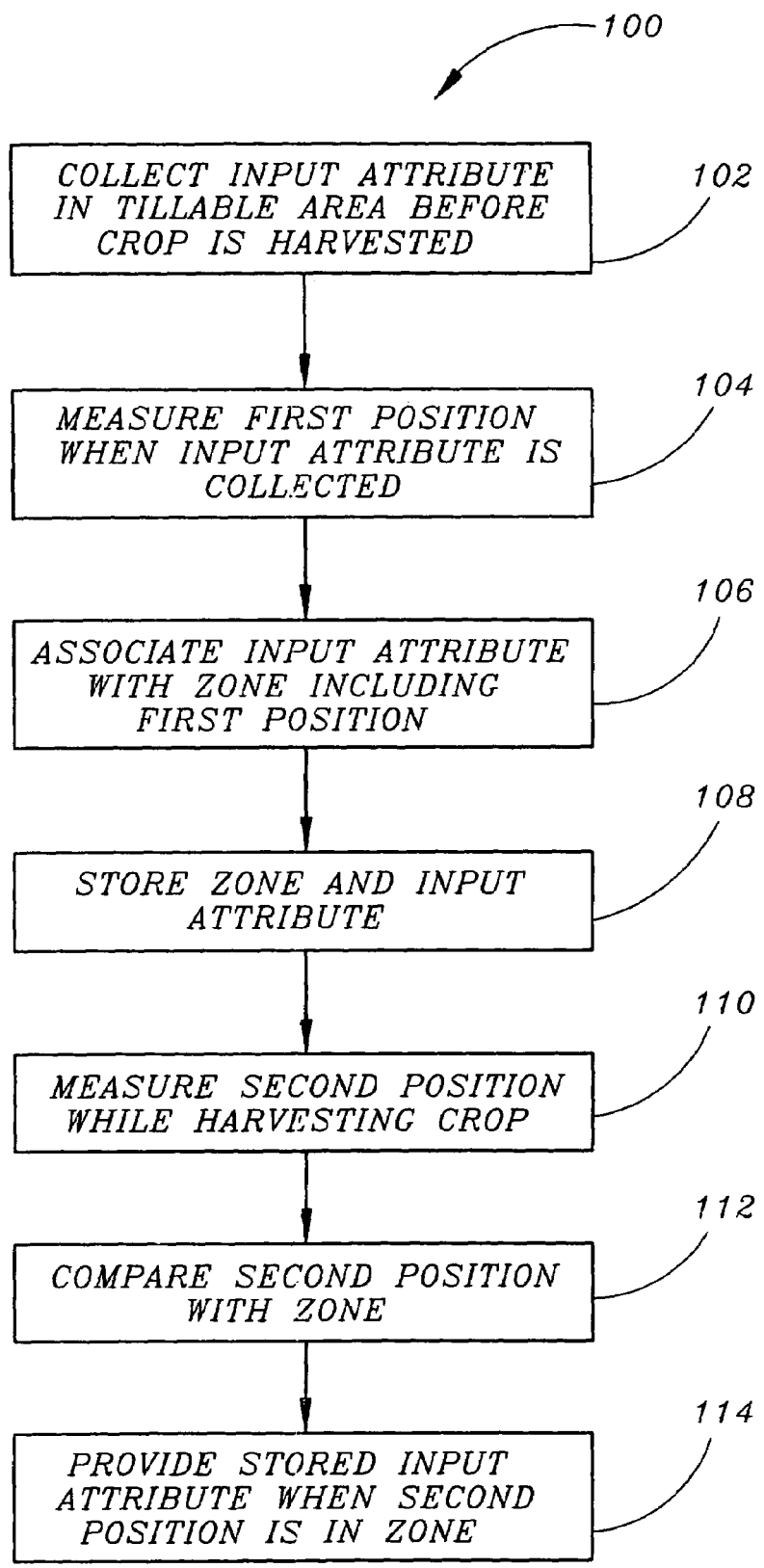
FIG. 1 is a flow diagram illustrating a method for providing an input attribute collected in a tillable area while harvesting a crop from the area in accordance with an exemplary embodiment of the present invention.
Figure 3:
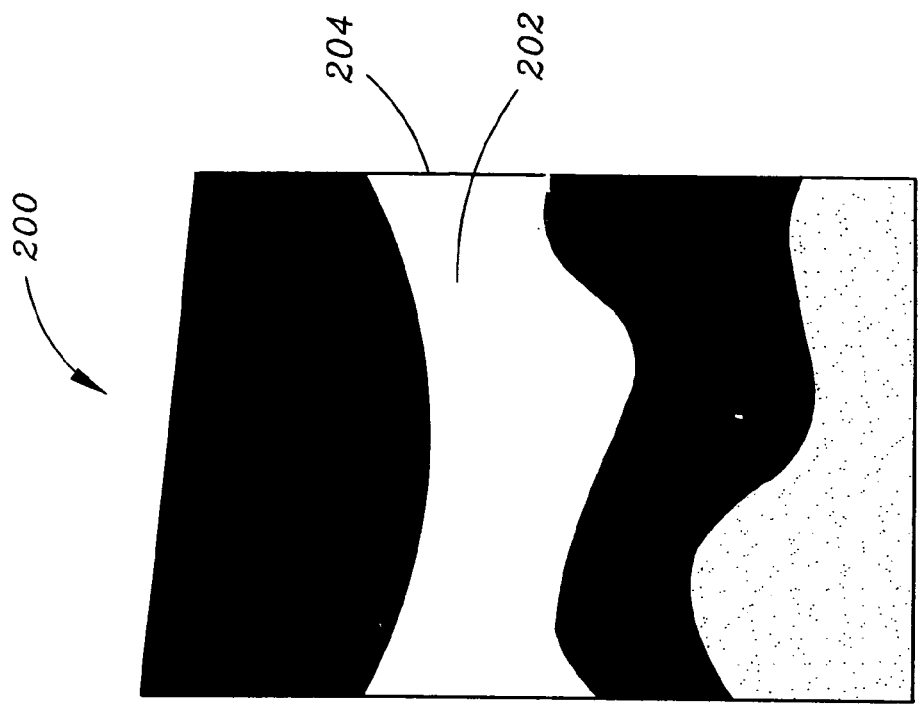
FIG. 3 is a plan view of the tillable area illustrated in FIG. 2, wherein the tillable area includes a zone comprising a polygon.
Figure 2:
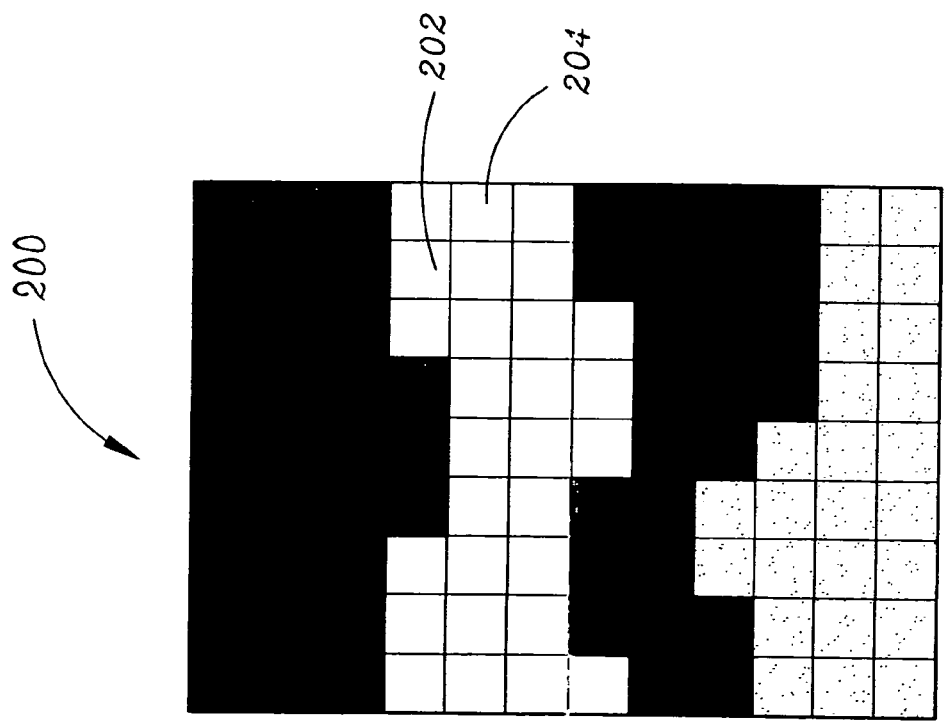
FIG. 2 is a plan view illustrating a tillable area, wherein the tillable area includes a zone comprising a plurality of grid cells.
Figure 4:
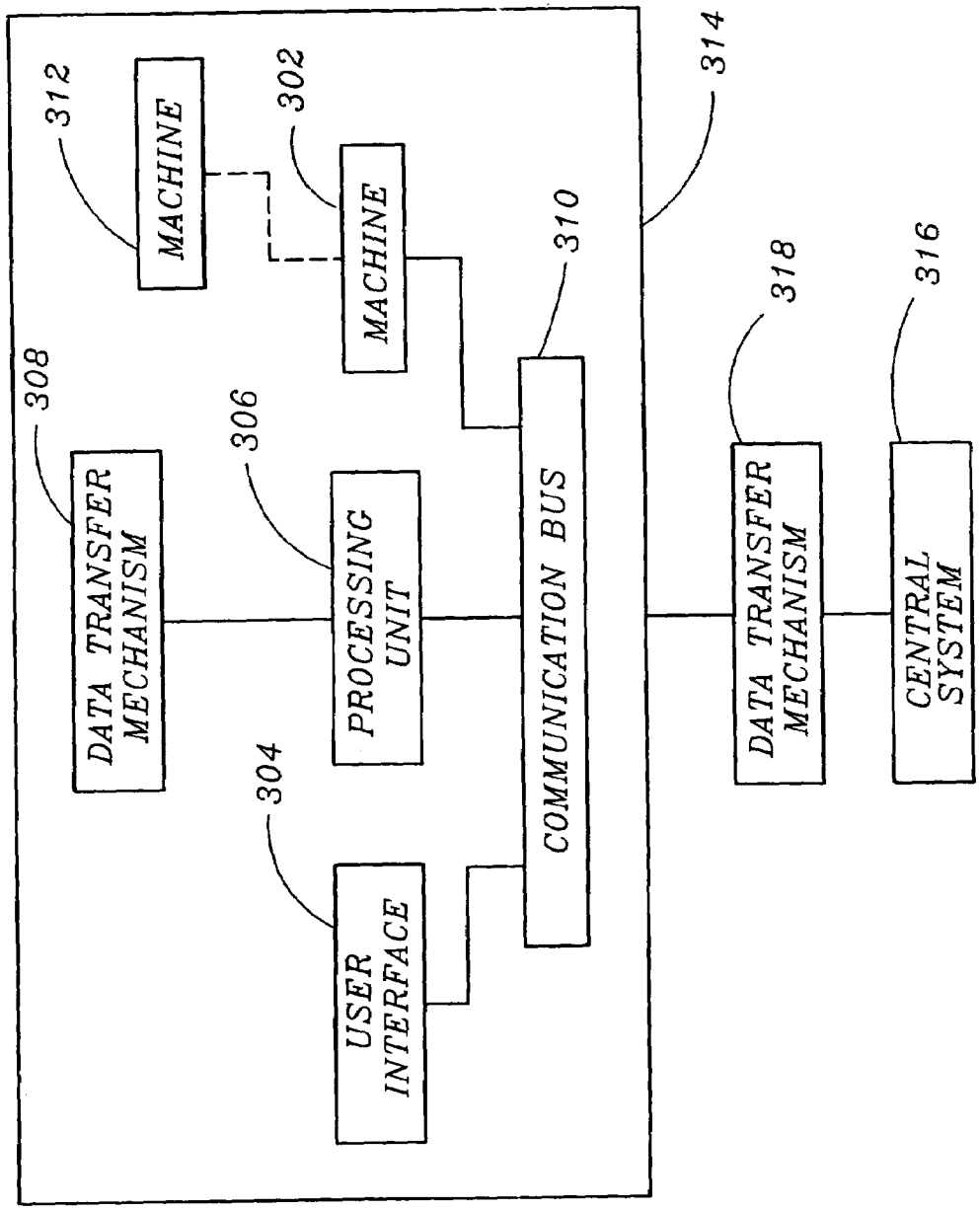
FIG. 4 is a system diagram illustrating a system for providing an input attribute collected in a tillable area while harvesting a crop from the area in accordance with an exemplary embodiment of the present invention.

Referring generally to FIGS. 1 through 4, a method 100 for providing an input attribute collected in a tillable area 200 while harvesting a crop from the tillable area is described in accordance with an exemplary embodiment of the present invention. Preferably, the method 100 allows an operator to input desired information about the tillable area 200 in the form of the input attribute, such as identifying information collected during the planting and growing phases of the crop production cycle. For example, at step 102, the input attribute is collected before the crop is harvested. In one specific embodiment, the input attribute describes a type of seed planted, while in other embodiments, the input attribute includes a variety of seed planted, a chemical treatment applied to the tillable area 200, a process performed upon the tillable area, and the like. Those of skill in the art will appreciate that the input attribute may include other descriptive information regarding the tillable area 200 as well, without departing from the scope and intent of the present invention. Further, it will be appreciated that a single input attribute may be utilized to describe a plurality of identifying information. For instance, a first numerical value is utilized to represent a first seed variety planted in combination with a specified fertilizer, while another numerical value is utilized to represent a second seed variety planted in combination with the same fertilizer.

In one specific embodiment, the input attribute is collected by a system 300 from an operator of a machine 302. The machine 302 may be a tractor or another machine utilized for applying materials to the tillable area 200. In embodiments, the input attribute is collected from the operator of the machine via a user interface 304. For example, the operator of the machine 302 may specify a seed variety being planted via the user interface 304, such as inputting the seed variety via a touch screen, a keyboard, or a like input device. Alternatively, the input attribute is collected directly from the machine 302. For example, the machine 302 may specify a chemical treatment being applied to the tillable area 200. In such an instance, a processing unit 306 including a data transfer mechanism 308 (e.g. a PC card) may be in communication with the machine 302, for collecting information about the machine's activities in the tillable area 200. For example, the machine 302 may be connected to the processing unit 306 and the PC card via a communication bus 310. Alternatively, the machine 302 may be connected to the data transfer mechanism 308 via a wireless link. Those of skill in the art will appreciate that the utilization of other techniques for connecting the machine 302 to the data transfer mechanism 308 would not fall outside the scope and intent of the present invention. It should also be noted that the machine 302 may be connected to another machine 312, such as a farming implement for towing behind a tractor. In such an instance, the second machine 312 may communicate with the machine 302 via communication bus 310, a wireless link, or the like, for providing an input attribute to the processing unit 306. Alternatively, the second machine 312 may be in direct communication with the data transfer mechanism 308 via bus architecture, such as the communication bus 310, via a wireless link, and the like.

Next, at step 104, a geographic position 202 occupied by the machine 302 is measured. Preferably, the geographic position of the machine (e.g., latitude and longitude) is measured when the input attribute is collected. In one embodiment, a positioning system is utilized to measure the geographic position 202 of the machine 302 when the input attribute is collected. For instance, a positioning system receiver assembly receives positioning signals from a positioning system and generates positioning system based navigation information including position (e.g., latitude and longitude), course or heading, speed, time, and the like. In exemplary embodiments, the positioning system receiver assembly receives positioning signals from the Global Positioning System (GPS), a space-based radio-navigation system managed by the United States Air Force for the Government of the United States. However, it is contemplated that the positioning system receiver assembly may alternately be adapted for use with other radio based navigation/global positioning systems such as the GLONASS Navigation Satellite System managed by the Russian Space Agency (RSA) for the Russian Federation. Additionally, in embodiments of the invention, the positioning system receiver assembly may be capable of receiving and utilizing enhanced positioning information provided by differential GPS systems and wide area differential GPS (WADGPS) such as the STARFIRE™ WDGPS system developed by John Deere and Company of Moline, Ill., the Wide Area Augmentation System (WAAS) provided by the Federal Aviation Administration of the United States Government, or the like. In such embodiments, the positioning system receiver assembly may include, or be coupled to, a radio receiver for receiving differential error correction information.

Preferably, the input attribute and the geographic position 202 are transmitted from the machine 302 (i.e. from vehicle system 314) to a central system 316, such as a personal desktop computer, a centrally located server, or the like. In embodiments, the input attribute and the geographic position 202 are transmitted from the processing unit 306 of the vehicle system 314 to the central system 316 via a wireless connection, a communication bus, an Internet connection, an intranet connection, or the like, such as an Ethernet connection between data transfer mechanism 308 and data transfer mechanism 318. In one embodiment, the input attribute and the geographic position 202 are transmitted to the central system after a portion of the tillable area 200 has been traversed by the machine 302, while in a further embodiment, each input attribute and geographic position 202 is transmitted to the central system 316 as it is collected. For example, in one specific embodiment, an operator traverses a portion of the tillable area 200 and then connects his vehicle system 314 to the central system 316 via an Ethernet connection between data transfer mechanisms 308 and 318, for transmitting the input attribute and the geographic position 202 from the processing unit 306 to the central system 316. In another embodiment, each input attribute and geographic position 202 is transmitted via a wireless connection between data transfer mechanisms 308 and 318.

At step 106, the input attribute is associated with a zone 204 including the geographic position 202 at which the input attribute was collected while traversing the tillable area 200. In embodiments, the zone 204 includes a plurality of geographic positions within the tillable area 202. Preferably, the plurality of geographic positions included in the zone 204 includes geographic positions for which the same (or sufficiently similar) input attributes have been collected. For instance, each geographic position within the zone 204 is seeded with the same variety of seed. It should be noted that geographic positions within the zone 204 for which sufficiently similar input attributes have been collected may be grouped together utilizing the zone 204, e.g. each geographic position within the zone 204 is seeded with a differing variety of seed for the same crop. Alternatively, where multiple input attributes have been collected, preferably at least one of the multiple input attributes is applicable throughout a zone grouping the input attributes. For example, each geographic position within the zone 204 is seeded with the same variety of seed, but may be fertilized with a differing variety of fertilizer. Thus, in exemplary embodiments, the zone 204 represents a geographic region in which an input attribute associated with the zone 204 is applicable.

At step 108, the zone 204 is stored along with its associated input attribute. In one embodiment, the zone 204 and the input attribute are stored in the memory of the central system 316. In other embodiments, the zone 204 and the input attribute are stored in the memory of the vehicle system 314. It will be appreciated that the zone 204 and the input attribute may be stored in a database, a linked list, or in another data format as contemplated by one of skill in the art. In one specific embodiment, for instance, the zone 204 is stored as one or more grid cells, in which case the input attribute is associated with a grid cell or a plurality of grid cells. In another specific embodiment, the zone 204 is stored as a polygon and the input attribute is associated with the polygon. For example, the polygon may describe a planar surface defined by one exterior boundary and zero or more interior boundaries, each interior boundary describing a portion of the zone not included in the polygon. Those of skill in the art will appreciate that the zone 204 may be stored in various ways without departing from the scope and intent of the present invention.

At step 110, as the crop planted in the tillable area 200 is harvested, a geographic position occupied by the machine 302 is measured (e.g., latitude and longitude). Those of skill in the art will appreciate that another machine may also be utilized in place of machine 302 to harvest a crop, and the location of the other machine would be measured in place of machine 302. In embodiments, a positioning system receiver assembly receives positioning signals from a positioning system and generates positioning system based navigation information for the harvesting equipment, including geographic position (e.g., latitude and longitude), course or heading, speed, time, and the like. For example, in one embodiment, a positioning system is utilized to measure the geographic position of the machine 302, while in another embodiment a positioning system is utilized to measure the geographic position of another machine for harvesting the crop planted in the tillable area 200.

At step 112, the position of the machine measured at step 110 is compared with the zone 204 stored in step 108. In embodiments, the position of the machine measured at step 110 is compared with the zone 204 utilizing the processing unit 306 (or another processing unit). If the position of the machine is determined to be within the zone 204, the input attribute associated with the zone 204 is supplied to the operator of the machine via the user interface 304, at step 114. For instance, if the position of the machine is within the bounds of a grid cell stored with the zone 204, the input attribute associated with the grid cell is supplied to the operator via the user interface 304. Alternatively, if the position of the machine measured at step 110 is within the exterior boundary of a polygon representing the stored zone 204 (but not within an interior boundary), the input attribute associated with the zone 204 is supplied to the operator of the machine via the user interface 304. More specifically, when a harvesting machine is located at position 202, the input attribute collected by the machine 302 at location 202 is supplied to the operator of the harvesting machine. Further, when the harvesting machine is located within the zone 204 associated with the input attribute collected at location 202, the input attribute is supplied to the operator of the harvesting machine.

Those of skill in the art will appreciate that the input attribute, in combination with the zone, may be utilized for segregating a harvested crop. For instance, a crop harvested from the tillable area 200 may be segregated by harvesting only a portion of the crop located within the zone 204, while harvesting another portion of the crop from another zone having a different input attribute, and keeping the harvested crop loads separated. In this manner, the harvested crop is segregated. This would be desirable for keeping different types of crops separate, e.g. crops fertilized with different materials, and the like. It will also be appreciated that an input attribute collected and associated with a zone may be further associated with a portion of the crop harvested from the zone, such as for identification purposes. For example, a crop harvested in zone 204 is associated with the input attribute collected at geographic position 202. It is further contemplated that a positioning system, the collected input attribute, and the zone may be utilized for providing automated guidance to a harvesting machine without departing from the scope of the present invention. For instance, an operator may specify a desired portion of the crop for harvesting within the tillable area 200, e.g. a portion of the crop disposed within the zone 204. Then, a harvesting machine may utilize automated guidance functionality in combination with the positioning system for guiding the machine to harvest that portion of the crop disposed within the zone 204. It is contemplated that the utilization of other guidance techniques for segregating a harvested crop utilizing the input attribute and the zone 204 would not fall outside of the scope and spirit of the present invention.

In the exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for providing an input attribute collected in a tillable area while harvesting a crop from the tillable area, comprising:

collecting the input attribute in the tillable area before the crop is harvested, the input attribute being collected from at least one of a machine for applying materials to the tillable area and an operator of the machine;

measuring a first geographic position for the machine when the input attribute is collected;

associating the input attribute with a zone including the first geographic position, the zone comprised of a plurality of geographic positions in the tillable area;

storing the zone and the associated input attribute;

measuring a second geographic position while harvesting the crop from the tillable area;

comparing the second geographic position with the zone; and providing the stored input attribute when the second geographic position is in the zone.

2. The method as claimed in claim 1, wherein the step of collecting the input attribute includes collecting at least one of a type of seed planted, a variety of seed planted, a chemical treatment applied to the tillable area, and a process performed on the tillable area.

3. The method as claimed in claim 1, wherein the input attribute is for segregating the harvested crop.

4. The method as claimed in claim 1, wherein at least one of the step of measuring the first geographic position and the step of measuring the second geographic position comprises measuring at least one of the first and second geographic positions utilizing a global positioning system (GPS).

5. The method as claimed in claim 1, wherein the step of collecting the input attribute comprises collecting the input attribute from a tractor.

6. The method as claimed in claim 1, wherein the step of associating the input attribute with the zone comprises associating the input attribute with a grid cell.

7. The method as claimed in claim 1, wherein the step of associating the input attribute with the zone comprises associating the input attribute with a polygon.

8. The method as claimed in claim 7, wherein the polygon describes a planar surface defined by one exterior boundary and zero or more interior boundaries, each interior boundary describing a portion of the zone not included in the polygon.

9. The method as claimed in claim 1, wherein the input attribute is associated with a portion of the crop harvested in the zone.

10. A system for providing an input attribute collected in a tillable area while harvesting a crop from the tillable area, comprising:
    a data transfer mechanism for collecting the input attribute in the tillable area before the crop is harvested, the input attribute being collected from at least one of a machine for applying materials to the tillable area and an operator of the machine;
    a positioning system for measuring a first geographic position for the machine when the input attribute is collected and for measuring a second geographic position while harvesting the crop from the tillable area;
    a memory for storing the input attribute and an associated zone including the first geographic position, the zone comprised of a plurality of geographic positions in the tillable area;
    a processing unit for comparing the second geographic position with the zone; and
    a user interface for providing the stored input attribute when the second geographic position is in the zone.

11. The system as claimed in claim 10, wherein the input attribute includes at least one of a type of seed planted, a variety of seed planted, a chemical treatment applied to the tillable area, and a process performed on the tillable area.

12. The system as claimed in claim 10, wherein the input attribute is for segregating the harvested crop.

13. The system as claimed in claim 10, wherein the positioning system comprises a global positioning system (GPS).

14. The system as claimed in claim 10, wherein the input attribute is associated with a portion of the crop harvested in the zone.

15. A program of instructions storable on a medium readable by an information handling system for implementing a method enabling the information handling system to execute a function, the information handling system being configured to communicate with a central system via a data transfer mechanism and a positioning system via a communication link, the steps comprising:
    requesting an input attribute via at least one of a machine for applying materials to a tillable area and an operator of the machine, the input attribute being requested in the tillable area before a crop is harvested;
    providing communication between the information handling system and the positioning system via the communication link;
    determining a first geographic position for the machine via the communication link when the input attribute is collected;
    providing communication between the information handling system and the central system via the data transfer mechanism;
    providing the input attribute and the first geographic position to the central system via the data transfer mechanism, the central system associating the input attribute with a zone including the first geographic position, the zone comprised of a plurality of geographic positions in the tillable area;
    determining a second geographic position via the communication link while harvesting the crop from the tillable area;
    requesting the zone and the associated input attribute from the central system via the data transfer mechanism;
    comparing the second geographic position with the zone; and
    providing the stored input attribute to the operator of the machine when the second geographic position is in the zone.

16. The program of instructions as claimed in claim 15, wherein the step of requesting the input attribute includes requesting at least one of a type of seed planted, a variety of seed planted, a chemical treatment applied to the tillable area, and a process performed on the tillable area.

17. The program of instructions as claimed in claim 15, wherein the input attribute is for segregating the harvested crop.

18. The program of instructions as claimed in claim 15, wherein at least one of the step of determining the first geographic position and the step of determining the second geographic position comprises determining at least one of the first and second geographic positions utilizing a global positioning system (GPS).

19. The program of instructions as claimed in claim 15, wherein the step of comparing the input attribute with the zone comprises comparing the input attribute with a grid cell.

20. The program of instructions as claimed in claim 15, wherein the step of comparing the input attribute with the zone comprises comparing the input attribute with a polygon.

* * * * *